UNITED STATES PATENT OFFICE.

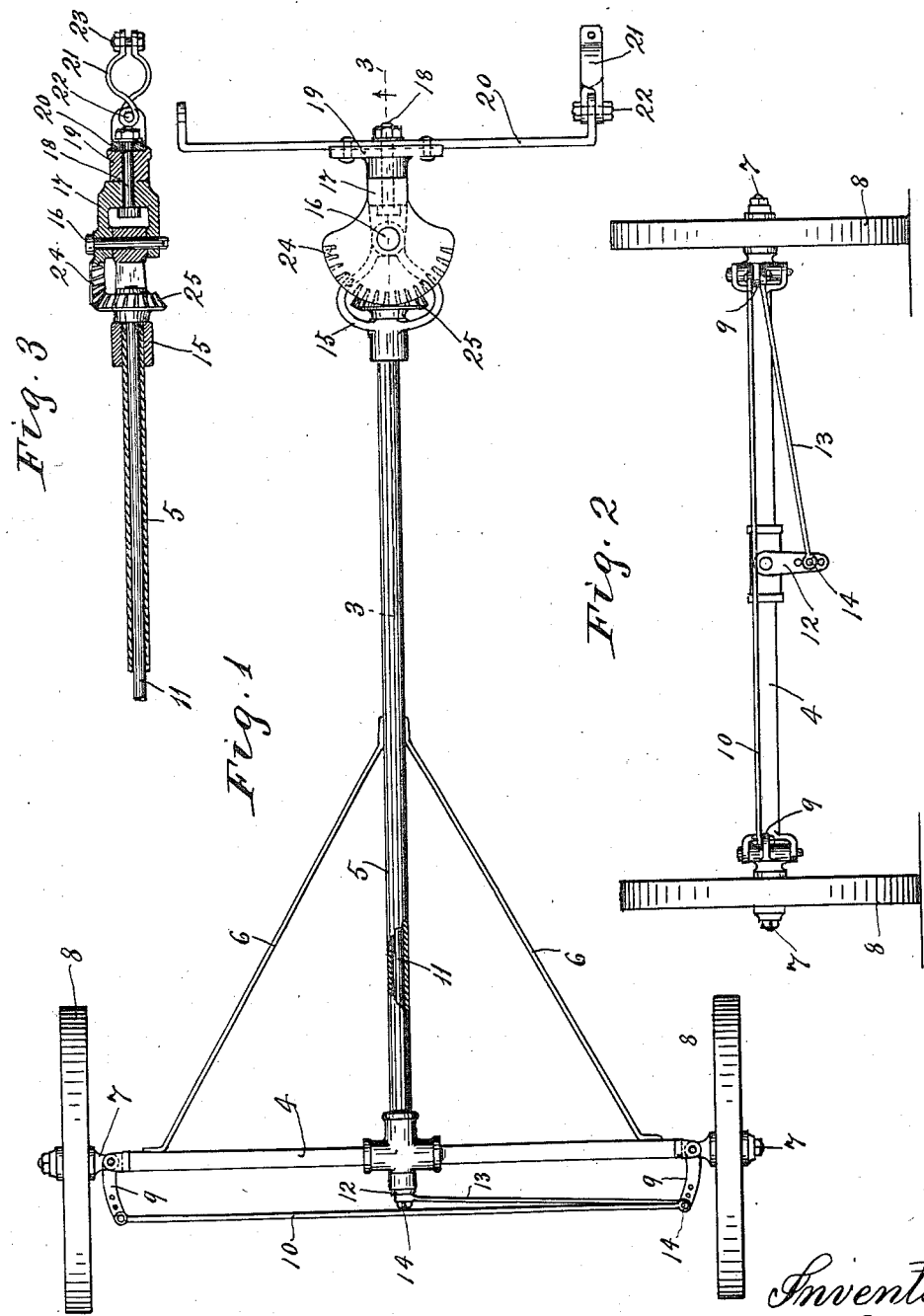

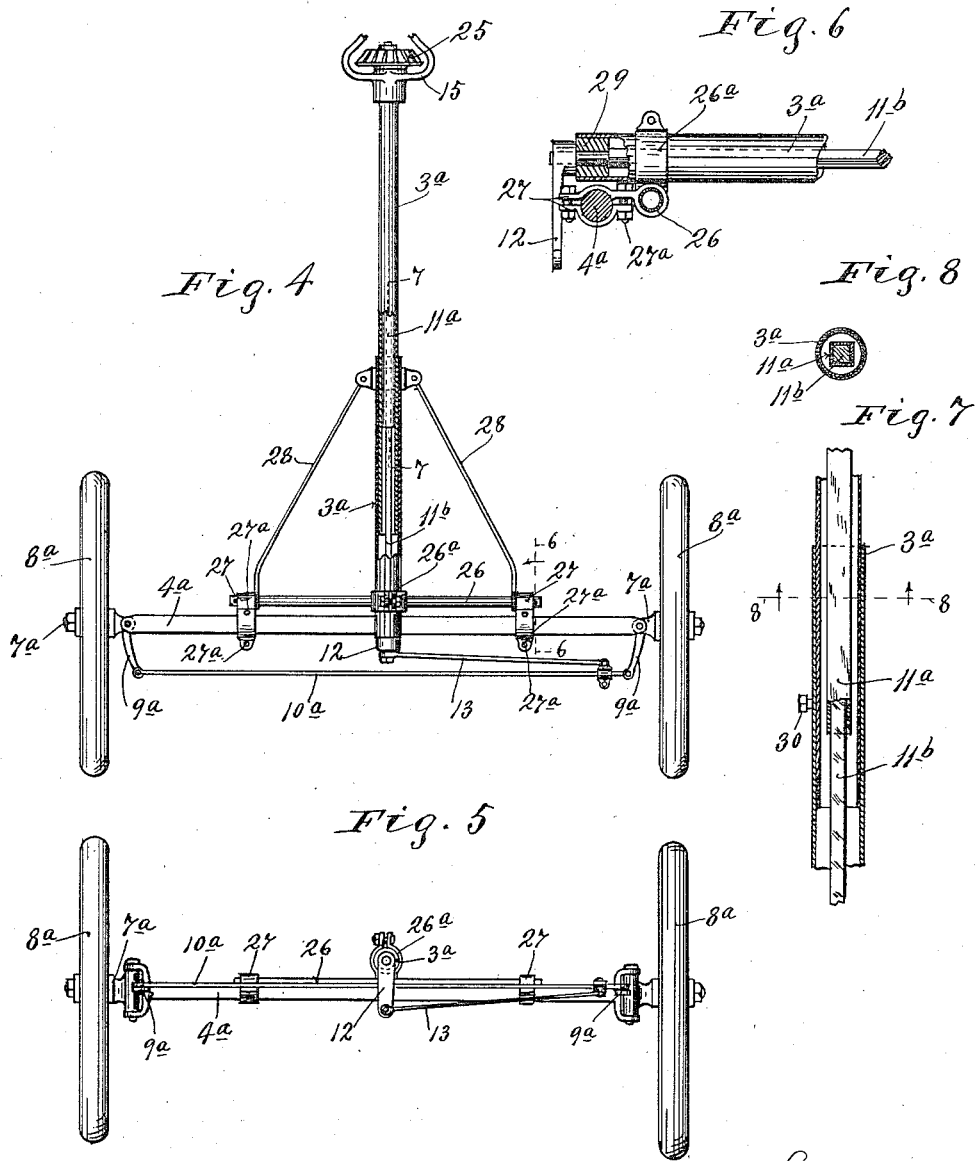

WALTER L. DAHL, OF COKATO, MINNESOTA.

SELF-STEERING TRAILER.

1,285,059.   Specification of Letters Patent.   Patented Nov. 19, 1918.

Application filed April 22, 1918. Serial No. 230,147.

*To all whom it may concern:*

Be it known that I, WALTER L. DAHL, a citizen of the United States, residing at Cokato, in the county of Wright and State of Minnesota, have invented certain new and useful Improvements in Self-Steering Trailers; and I do hereby declare the following to be a full, clear, and exact description of the invention, such as will enable others skilled in the art to which it appertains to make and use the same.

My invention has for its object to provide an improved steering mechanism for so-called self-steering trailers; and to such ends generally stated, the invention consists of the novel devices and combinations of devices hereinafter described and defined in the claims.

The term "trailer" is herein used in a broad and liberal sense to include any kind of a wheeled vehicle that is trailed behind an automobile or motor propelled lead vehicle. Two important applications of the invention are; *a*, for drawing a two-wheeled trailer at the rear of an automobile; and *b*, for drawing one or more automobiles as trailers at the rear of a lead automobile.

In the accompanying drawings which illustrate the invention, like characters indicate like parts throughout the several views.

Referring to the drawings:

Figure 1 is a plan view of the running gear and steering mechanism of the trailer;

Fig. 2 is a rear elevation of the parts shown in Fig. 1;

Fig. 3 is a vertical section taken on the line 3—3 of Fig. 1;

Fig. 4 is a view chiefly in plan but with some parts in section, illustrating the steering connection applied to the front axle of a rear vehicle;

Fig. 5 is a rear elevation of the parts shown in Fig. 4;

Fig. 6 is a section on the line 6—6 of Fig. 4, some parts being broken away;

Fig. 7 is an enlarged section taken approximately on the line 7—7 of Fig. 4; and Fig. 8 is a transverse section on the line 8—8 of Fig. 7.

Referring first to the arrangement illustrated in Figs. 1, 2 and 3, the running gear comprises a rear axle 4, having a rigidly connected forwardly projecting reach bar 5, preferably in the form of a metal tube or pipe. Brace rods 6 connect the intermediate portion of the reach 5 to the end portions of the axle 4. Stub axles 7 are pivoted to the ends of the axle 4 and wheels 8 are journaled thereon. The stub axles 7 are provided with rearwardly projecting arms 9 and are cross connected by a connecting rod 10, which causes the two wheels 8 to remain approximately parallel when oscillated on the pivotal connections between the main and stub axles.

A rock shaft 11 is extended through the tubular reach 5, and, at its rear end, is provided with a rigidly secured depending arm 12. A crank rod 13 is pivotally connected to one of the arms 9 at its outer end, and at its inner end is pivotally connected to the depending arm 12. The pivotal connection between the rod 13 and arm 12 is preferably made adjustable by means of a plurality of holes in said arm, into any one of which the coupling pin or bolt 14 of the said pivotal connection may be applied.

A cast yoke 15 is rigidly secured to the front end of the tubular reach 5, and the front end of this yoke, by means of a vertical coupling pin 16, is pivotally connected to a forked head 17. This forked head 17, by means of a horizontal nut-equipped swivel bolt 18, is connected to a bearing 19, which, in turn, is rigidly secured to the central portion of a strap-like anchor bracket 20. At its ends, the bracket 20 has forwardly projected perforated ears, to which pronged clamping brackets 21 are pivotally connected at 22. These clamping brackets 21 are adapted to be secured around the rear axle casing of an automobile. For thus securing the brackets 21 to the rear axle casing, short nut-equipped bolts 23 are applied to the perforated ends thereof. Of course, any other suitable means may be employed for securing the anchor bracket 20 to the rear axle or other suitable rear portion of the automobile.

The upper flange of the forked head 17 is extended and made in the form of a bevel gear segment 24, that meshes with a bevel pinion 25, which latter is located within the yoke 15 and is rigidly secured to the front end of the rock shaft 11.

The body of the trailer will, of course, be carried from the running gear in the usual or any suitable way, not necessary for the purposes of this case, to consider.

In the operation, the anchor bracket 20 will partake of the angular movements of the rear axle of the automobile and when the automobile is turned over toward the right or toward the left the segmental gear acting on the bevel gear 25 will rock the shaft 11 in the proper direction to cause the crank arm 12 and rod 13 to oscillate the wheels 8 in the proper direction to cause the said wheels 8 to trail the rear wheels of the automobile, or, in other words, to run in approximately the same tracks. The adjustment of the pivotal connection between the arm 12 and rod 13 provides for the regulation of the steering action to cause the proper trailing of the trailer wheels with the wheels of the automobile.

The pivotal connection of the pin 16, of course, permits the above described movement of the gear 24, and the necessary angular movement of the reach 5. The swivel connection on the bolt 18 permits the rear wheels to adapt themselves to irregularities of the road bed, or, in other words, permits the running gear of the trailer to oscillate from side to side without putting the strain on the connections between the trailer and the automobile. Preferably, the separation between the trailer and the automobile will be made by removing the coupling bolts 22, but it might be made by removing the swivel bolt 18.

Referring now to the arrangement illustrated in Figs. 4 to 8, inclusive, the front portion of the coupling device, to wit, the gear and piston connection 24—25 and coupling brackets, may be the same as that above described, but in this arrangement, the rear end of the coupling and steering device is applied to the front axle of a rear vehicle or automobile.

$4^a$ indicates the front axle of the said rear vehicle, such as an automobile that is being towed, $8^a$ the front wheels, $7^a$ the pivotal axle, $9^a$ the arms from said trunnions, and $10^a$ the transverse rod that connects the arm $9^a$. In this modified arrangement, the reach $3^a$ is made up of telescoped tubes, the rear end of the rear section thereof being connected by split clamp $26^a$, or the like, to a transverse hinge rod 26, which latter, as shown, is in the form of a tube. The ends of the hinge rod 26 are pivoted in split clamping brackets 27, which, by means of nut-equipped bolts $27^a$, are rigidly but detachably clamped to the front axle $4^a$ of the said rear vehicle. The hinge afforded by the rod 26 permits the wheels of the lead and trailing automobiles to adapt themselves to irregular roads and to running over crowns of elevations, and the like. The hinge rod 26 is further connected to the front end of the rear section of the extensible reach $3^a$ by means of brace rods 28. Also, in this construction, the shaft that connects the pinion 25 to the crank 12 is made longitudinally extensible and is composed of two telescopic sections $11^a$ and $11^b$. By means of a key and keyway or other sliding engagement, the shaft sections $11^a$ and $11^b$ are caused to rotate together. To afford a suitable bearing in the cylindrical rear end of the shaft section $11^b$ (see Fig. 6), a bearing plug 29 is inserted in the rear end of the rear section of the telescopic reach $3^a$.

The steering action of this last described arrangement is the same as that of the first. In some vehicles, the arms from the axle trunnions project forward of the front axle, and in such construction, the crank 12 should be set upward instead of downward. This setting of the crank may be easily adjusted in several ways, preferably by simply removing the pin 16, turning the shaft and crank through 180 degrees, then re-applying the pin 16 with the pinion 25 properly engaged with the segmental gear 24.

For locking the sections of the telescopically extensible reach $3^a$ in its set adjustment, a set screw 30, (see Fig. 7), or any other suitable device may be provided.

The device last described will be found highly desirable for trailing one or more automobiles behind a lead machine. Such devices are especially desired at this time because of the difficulty or impossibility of securing cars for the shipment of automobiles. The difficulty of securing cars has made it a common practice to drive cars from the factory to points hundreds of miles distant from the place of manufacture. There is, of course, great economy in labor in drawing one or more cars from the lead car, which may be run by one man.

The device last described is highly efficient for the latter noted purpose. It is also important to note that the reach to the shaft may be lengthened or shortened, as required to properly propel cars of different make and that will be done without interfering with the adjustments of the automobile steering mechanism.

From the foregoing, it will be understood that the term "trailer" is used in a sense broad enough to include either a trailing cart or an ordinary automobile drawn at the rear of a lead machine. When the coupling and steering mechanism is applied, as shown in Fig. 4, the reach $3^a$ bears the same relation to the bearing axle of the rear vehicle that it does to the axle of the two-wheeled trailer illustrated in Figs. 1, 2 and 3, and may, therefore, be treated as the reach of the trailer or trailing vehicle.

The device described can be made at comparatively small cost and is highly efficient for the purposes had in view.

What I claim is:

1. The combination with the running gear of a trailer, of a rock shaft extending along the reach thereof, a crank connection between the rear end of said rock shaft and the trailer wheels, an anchoring device for connection to the rear portion of an automobile, and a gear connection between said anchoring device and the front end of said rock shaft.

2. The combination with the running gear of a trailer, of a rock shaft extending along the reach thereof, a crank connection between the rear end of said rock shaft and the trailer wheels, an anchoring device for connection to the rear portion of an automobile, and a gear connection between said anchoring device and the front end of said rock shaft, the said connections including a longitudinal swivel for permitting the trailer wheels to adapt themselves to irregularities in the road.

3. The combination with the running gear of a trailer truck, said running gear including a reach, of a yoke secured to the front end of said reach, an anchoring bracket having a head pivotally connected to said yoke by a vertical pivot, a rock shaft mounted on said reach, a bevel gear located within said yoke and secured to the front end of said rock shaft, a bevel gear meshing with said first noted bevel gear and mounted for horizontal movements with said coupling bracket, a crank arm secured to the rear end of said rock shaft, means connecting the wheels of the truck for parallel oscillatory movements, and a crank rod connecting said crank arm to said wheel connections.

4. A combined coupling and steering device for causing one vehicle to trail another, comprising a reach having means at its front end for connection to the rear portion of a lead vehicle, and having means at its rear end for connecting the same to the axle of a vehicle to be drawn, a rock shaft extended along said reach, a gear connection at the front end of said rock shaft, a crank at the rear end of said rock shaft, and a crank rod connected to said crank and having means for connection to the transverse steering rod of the rear vehicle.

In testimony whereof I affix my signature in presence of two witnesses.

WALTER L. DAHL.

Witnesses:
 CLARA DEMAREST,
 BERNICE G. BAUMANN.